United States Patent [19]

Seegers

[11] 4,057,298

[45] Nov. 8, 1977

[54] SAFETY VALVE DEVICE FOR MULTIPLE CIRCUIT FLUID PRESSURE OPERABLE BRAKE SYSTEM

[75] Inventor: Güenter Seegers, Barsinghausen, Germany

[73] Assignee: WABCO Westinghouse GmbH, Hannover, Germany

[21] Appl. No.: 771,767

[22] Filed: Feb. 24, 1977

[51] Int. Cl.² .............................................. B60T 17/18
[52] U.S. Cl. .................................... 303/84 R; 303/60
[58] Field of Search ...................... 303/1, 2, 13, 57, 59, 303/60, 63, 66, 84 R

[56] References Cited

U.S. PATENT DOCUMENTS

| | | | |
|---|---|---|---|
| 1,805,631 | 5/1931 | McCune | 303/84 R |
| 1,842,514 | 1/1932 | Farmer | 303/84 R |
| 1,935,791 | 11/1933 | Farmer | 303/60 |
| 2,103,349 | 12/1937 | Conant et al. | 303/84 R |
| 2,804,354 | 8/1957 | Cook | 303/60 |

Primary Examiner—Duane A. Reger
Attorney, Agent, or Firm—R. S. Visk; R. W. McIntire, Jr.

[57] ABSTRACT

A safety valve device for use in a multiple circuit fluid pressure operable brake system for insuring supply and preservation, in the event of fluid pressure failure in one or more of the circuits, in the remaining circuits for assuring, at least, limited operation of the brake system.

6 Claims, 1 Drawing Figure

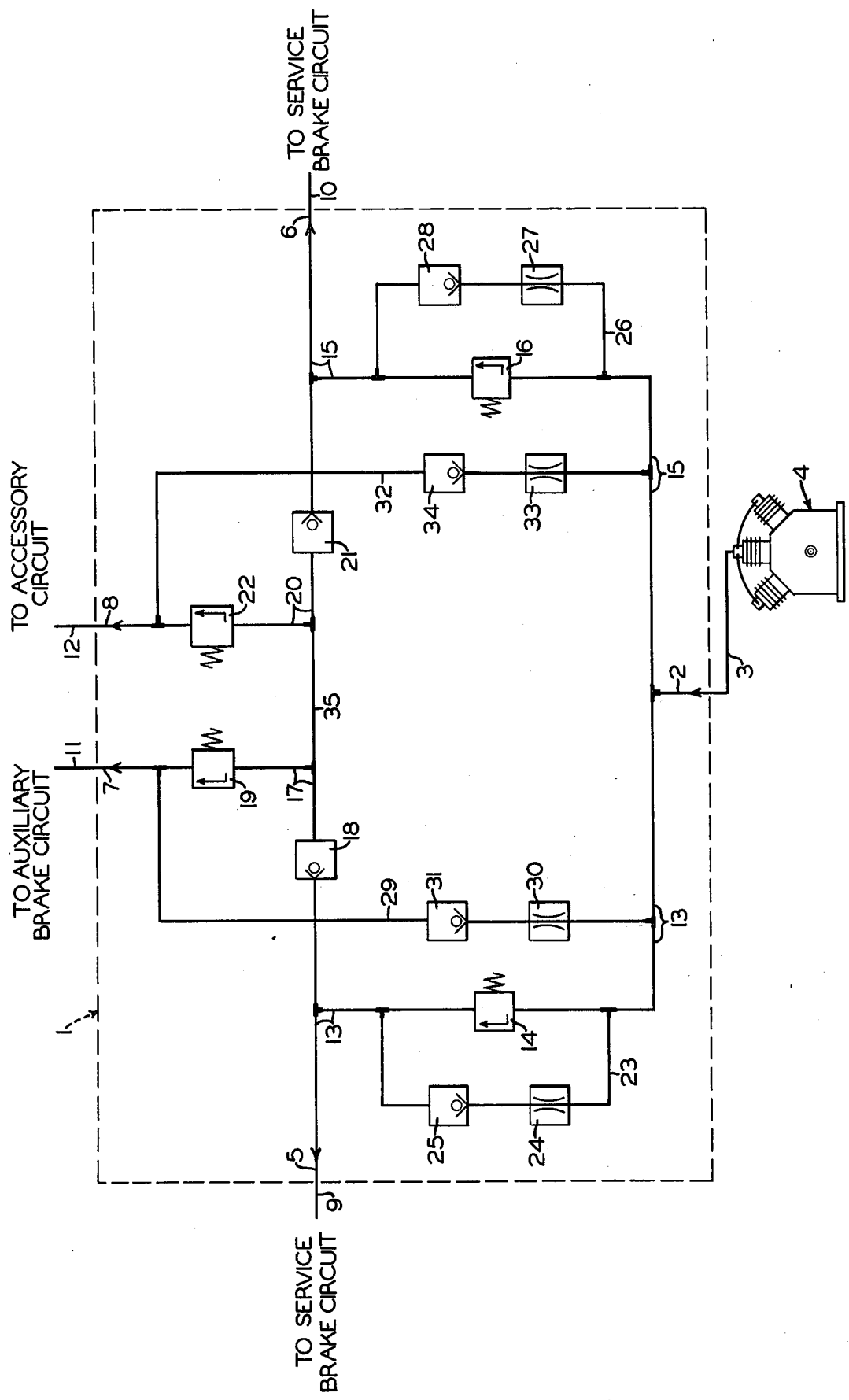

SAFETY VALVE DEVICE FOR MULTIPLE CIRCUIT FLUID PRESSURE OPERABLE BRAKE SYSTEM

BACKGROUND OF THE INVENTION

Presently known fluid pressure brake systems may typically comprise, in addition to a plurality of service brake circuits, other auxiliary circuits such as an auxiliary or safety brake circuit and a fluid pressure circuit for attendant accessories of the system. Safety valve devices are provided for controlling the charging of the several circuits from a fluid pressure source in a certain desired order such that charging fluid pressure is supplied to the auxiliary circuits only after the service brake circuits have been changed, which means that the vehicle may be set in motion only after pressure has been adequately built up in at least one of the service brake circuits and sufficiently in the auxiliary safety brake circuit for releasing the spring-loaded brake cylinders.

Pre-set fluid pressure responsive supply valves are interosed in each of the circuits between the source and the circuit itself, said supply valves being pre-set to open to respective pressure to provide the priority of charging of the respective circuits, as above noted. These supply valves, of course, are subject on the supply side to pressure of the source and on the delivery side to the prevailing pressure in the respective circuit. Consequently, if a fluid pressure leak develops in one of the circuits as, for example, the one with the supply valve having the lowest opening pressure setting, it might be possible that even the intact circuits could not be charged since the supply pressure would simply escape to atmosphere via the supply valve of defective circuit.

The above-discussed shortcoming of presently known brake systems may be overcome by providing one-way bypassing means in parallel relation to each supply valve, thus making it possible to provide pressure to the intact circuits. But since the several circuits are all parallel to each other, additional check valves must be provided in each circuit to insure proper priority of charging of the several circuits. Such additional structure entails further excessive costs.

SUMMARY OF THE INVENTION

The object of the present invention, therefore, is to provide a safety valve for a multiple circuit fluid pressure operable brake system, which safety valve, in the event of fluid pressure failure in one of the circuits, insures charging of the intact circuits in order of desired priority without additional expensive check valve devices in the several circuits.

Briefly, the invention comprises a safety valve device for a multiple circuit fluid pressure operable brake system which may include, for example, a plurality of service brake circuits in addition to an auxiliary or safety brake circuit and an accessory circuit, said safety valve device having respective passageways for connecting a fluid pressure source to the several circuits via respective fluid pressure responsive supply valves interposed between said source and the passageways and pre-set to open responsively to respective pressures for charging the several circuits in a predetermined order of priority. A fluid pressure bypass of restricted flow capacity is provided at each of the supply valves to assure equalization of fluid pressure on both sides of the respective supply valves, and the several circuits are connected to each other in such manner so that in the event of fluid pressure failure in one or more of the circuits, such defective circuits are isolated from the intact circuits to prevent flow of fluid pressure from the intact circuits and escape thereof via the defective circuit or circuits.

The single FIGURE drawing is a diagrammatic view of a safety valve device embodying the invention.

DESCRIPTION AND OPERATION

A safety valve device for a multiple circuit fluid pressure operable brake system is shown diagrammatically in the drawing and includes a casing 1 (represented by broken outline) having a fluid pressure inlet port 2 connected via a supply pipe 3 to a source of fluid under pressure such as a compressor 4, for example. Casing 1 is also provided with fluid pressure outlet ports 5, 6, 7, and 8 connected to a plurality of fluid pressure circuits as, for example, a first service brake circuit 9, a second service brake circuit 10, an auxiliary brake circuit 11, and an accessory circuit 12, respectively.

Fluid pressure from pressure inlet 2 is supplied to the first service brake circuit 9 via a main supply passageway 13, in which a fluid pressure responsive cut-out valve 14 is interposed, and to the second service brake circuit 10 via a main supply passageway 15 in which a fluid pressure responsive cut-out valve 16 is interposed.

Fluid pressure is also supplied from inlet 2 to auxiliary brake circuit 11 via main supply passageway 13 and a branch supply passageway 17 connecting said main supply passageway to outlet 7. A one-way check valve 18 and a fluid pressure responsive cut-out valve 19 are serially interposed in branch supply passageway 17 between main supply passageway 13 and outlet 7 in the order named. In addition, fluid pressure is supplied from outlet 2 to accessory circuit 12 via main supply passageway 15 and a branch supply passageway 20 connecting said main supply passageway to outlet 8. A one-way check valve 21 and a fluid pressure responsive cut-out valve 22 are serially interposed in branch supply passageway 20 between main supply passageway 15 and outlet 8 in the order named.

A bypassing passageway 23 having its opposite ends connected to main supply passageway 13 in bypassing parallel relation to cut-out valve 14, has a choke 24 and a one-way check valve 25 serially interposed therein. A bypassing passageway 26 having its opposite ends connected to main supply passageway 15 in bypassing parallel relation to cut-out valve 16, has a choke 27 and a one-way check valve 28 serially interposed therein.

A bypassing passageway 29 having one end connected to main supply passageway 13 ahead of cut-out valve 14 and the other end connected to branch supply passageway 17 in bypassing parallel relation to cut-out valve 19, has a choke 30 and a one-way check valve 31 serially interposed therein. A bypassing passageway 32 having one end connected to main supply passageway 15 ahead of cut-out valve 16 and the other end connected to branch supply passageway 20 in bypassing parallel relation to cut-out valve 22, has a choke 33 and a one-way check valve 34 serially interposed therein.

A connecting passageway 35 is provided for connecting branch supply passageways 17 and 20, thus the several fluid pressure circuits 9, 10, 11, and 12 are all connectable in parallel relation to each other with respect to fluid pressure supply from inlet 2.

Since the service brake circuits 9 and 10 provide the primary braking action for the vehicle, these circuits should be given priority to the supply of fluid pressure from inlet 2. Possibly the auxiliary brake circuit 11 should be given the next priority, and the accessory circuit should be the lowest priority. For this reason, each of the cut-out valves 14, 16, 19, and 22, which are normally spring biased to respective closed positions, are pre-set to open, responsively to respective fluid pressures acting on respective pressure sides thereof, in a desired sequence, that is, with valves 14 and 16 being pre-set to open ahead of cut-out valves 19 and 22. Cut-out valve 22 probably has the highest opening pressure setting since it is connected to the accessory circuit 12, which has the lowest priority for fluid pressure supply.

In operation, fluid pressure supplied to the safety valve device by compressor 4 via supply inlet port 2, flows through main supply passageways 13 and 15 to cut-out valves 14 and 16 to effect operation of said cut-out valves to respective open positions after reaching the set opening pressures thereof, such opening being assisted by fluid pressure build-up in said main supply passageways behind said cut-off valves (and acting on the pressure sides thereof) due to restricted flow of fluid pressure via bypassing passageways 23 and 26. Fluid pressure may then flow through open cut-out valves 14 and 16, and via outlet ports 5 and 6 to the service brake circuits 9 and 10, respectively.

Fluid pressure is also supplied concurrently to branch supply passageways 17 and 20, which branch off main supply passageways 13 and 15, via check valves 18 and 21, and therefore flows, after opening of cut-out valves 19 and 22, to auxiliary brake circuit 11 and accessory circuit 12 via outlet ports 7 and 8, respectively, such opening of the cut-out valves also being assisted by pressure build-up behind the cut-out valves and acting on the pressure sides thereof via bypassing passageways 29 and 32.

If excessive leakage occurs in one of the service brake circuits 9 and 10, for example, sufficient to cause failure of one of said circuits, say circuit 9, for example, fluid pressure supplied by compressor 4 is diverted first to the leaking circuit. At the same time, pressure in the intact service brake circuit, 10 in this case, drops to the pre-set opening pressure of cut-out valve 14 of defective circuit 9. If subsequently, due to usage, pressure is reduced in the intact service brake circuit 10, the latter is than recharged up to the pre-set opening pressure of cut-out valve 14 of defective circuit 9. In the meantime, pressure in circuits 11 and 12 is maintained at the original levels via check valves 31 and 34. Also if, due to usage, fluid pressure in one or the other or circuits 11 and 12 drops below the pre-set opening pressure of defective circuit 9, then recharging thereof up to pressure corresponding to the pre-set opening pressure of cut-out valve 14 of defective circuit 9 also occurs.

Maintaining pressure in circuits 9, 11, and 12, in the event of failure of pressure in circuit 10, proceeds in a manner similar to that above described in connection with faulure of circuit 9. In case of failure of fluid pressure in circuit 11, for instance, pressure in circuits 9, 10, and 12 drops to the pre-set opening pressure of cut-out valve 19 of defective circuit 11, and is maintained at this level. In case pressure is reduced, through usage, in circuits 9, 10, or 12, said circuits are recharged up to the pre-set opening pressure of defective circuit 11.

Maintaining pressure in circuits 9, 10, and 11, in case of fluid pressure failure in circuit 12, proceeds in a manner similar to that discussed above. In the event of reduction of pressure in one of the circuits 9 or 10 to a value less than the pre-set opening pressure of cut-out valves 14 and 16, one-way check valves 25 and 28 protect against escape of fluid pressure from the intact circuit to the defective one.

In the event of fluid pressure failure in one of the circuits 9 or 10, the arrangement of one-way check valves 18 and 21 prevents fluid pressure from flowing out of the parallel, intact circuit through main supply passageway 13, connecting passageway 35, and main supply passageway 15 (if the failure is in circuit 10), or reversely through said passageways (if the failure is in circuit 9), and via the defective circuit.

It is clear from the description of the operation, as above set forth, that the manner in which the circuits are arranged relative to each other, charging of circuits 9 and 10 with fluid pressure on a priority basis is ensured without the use of additional control elements. Only after fluid pressure flows via open cut-out valves 14 and 16 to service brake circuits 9 and 10 is built up therein, is it possible to build up pressure sufficiently in branch supply passageways 17 and 20 to cause cut-out valves 19 and 22 to be opened and subsequently charging of circuits 11 and 12.

In addition to the function of the safety valve device as effected by the structure above defined, that is, in performing the normal functions required thereof, the safety valve device also meets the further requirement of compensating for pressure loss due to various adjustments and manufacturing tolerances. If one of the circuits develops fluid pressure failure, the remaining intact circuits may be charged with atmospheric pressure because of the fact that each of the cut-out valves 14, 16, 19, and 22 may be bypassed via the bypassing passageways 23, 26, 29, and 32 in which are interposed the chokes 24, 27, 30, and 33 and the one-way check valves 25, 28, 31, and 34, respectively.

Because of the arrangement of the aforementioned bypasses, all circuits can be charged uniformly and in a speedy manner with atmospheric pressure, since fluid pressure flowing to the several circuits via said bypasses, as was above noted, assists in opening the respective cut-out valves. If, due to leakage, fluid pressure fails in one of the circuits, the respective cut-out valve affiliated therewith closes due to such drop in pressure down to the atmospheric pressure on the circuit side of the cut-out valve until the intact circuits charge up to the pre-set opening pressure of the cut-out valve of the defective circuit, regardless of the initial pressure prevailing in said intact circuits. Also because of the bypass structure of the defective circuit, only a small amount of pressure may escape therefrom to atmosphere during the time interval required to charge the other circuits, so that there is no substantial loss of energy. Charging of intact circuits is also ensured in case leakage occurs concurrently in more than one circuit.

Accordingly, the safety valve device, which has been described above by way of example as a four-circuit device, combines the advantages of presently known devices with operating features that safeguard the brake circuits as well as secondary or auxiliary circuits associated therewith against malfunctions.

It should be apparent that the description of structure and operation above set forth is also applicable to three-circuit safety valve devices and to those having more than four circuits.

Having now described the invention what I claim as new and desire to secure by Letters Patent, is:

1. A safety valve device for a multiple fluid pressure operable brake system, said safety valve device comprising:
    a. a casing having an inlet port connected to a source of fluid under pressure and a plurality of outlet ports connected to a plurality of fluid pressure circuits each requiring a predetermined degree of operating fluid pressure, respectively, said circuits being communicable with said inlet port via supply passageways;
    b. respective cut-out valves interposed in said supply passageways between said fluid pressure circuits and said inlet port and being operable to respective open positions responsively to fluid pressure in the supply passageways at degrees corresponding to those required by the pressure circuits, respectively, for opening communication through the supply passageways between said pressure circuits and said inlet port;
    c. bypassing passageways means interposed in said supply passageways for providing restricted flow of fluid pressure from said inlet to said fluid pressure circuits in bypassing relation to the cut-out valves, respectively; and
    d. a plurality of check valves interposed, respectively, between said several fluid pressure circuits for providing flow of fluid pressure thereto in one direction from said supply passageways and for inhibiting flow of fluid pressure in an opposite direction from certain selected ones of said circuits to the remaining circuits in the event of failure of fluid pressure in said certain selected ones of said circuits.

2. A safety valve device, as set forth in claim 1, wherein said plurality of fluid pressure circuits includes, at least, a pair of service brake circuits connected to said supply passageways in parallel relation to each other and in series, respectively, with said certain selected ones of said circuits, and having a pair of said check valves interposed serially between said service brake circuits for inhibiting escape of fluid pressure from one of the service brake circuits to the other service brake circuit in the event of fluid pressure failure in one of the service brake circuits.

3. A safety valve device, as set forth in claim 1, wherein each of said bypassing passageways includes a choke and a one-way check valve serially interposed therein with the choke ahead of the one-way check valve in the direction of fluid pressure flow toward the fluid pressure circuits.

4. A safety valve device, as set forth in claim 2, wherein said supply passageways include a pair of main supply passageways each of which has one of the cut-out valves interposed therein and via which said pair of service brake circuits are supplied with fluid pressure from said inlet, and a pair of branch supply passageways branched of said main supply passageways, respectively, each of which branch passageways has one of the cut-out valves interposed therein and via which fluid pressure is supplied to said certain selected ones of said circuits.

5. A safety valve device, as set forth in claim 4, wherein said branch supply passageways are interconnected via a connecting passageway in which said pair of check valves is interposed.

6. A safety valve device, as set forth in claim 1, wherein each of said cut-out valves includes a pressure side subjectable concurrently to fluid pressure in the respective supply passageway on the inlet port side and to fluid pressure in the respective bypassing passageway for effecting operation of the cut-out valves to said open positions.

* * * * *